No. 869,671. PATENTED OCT. 29, 1907.
F. K. VIAL.
CAR WHEEL.
APPLICATION FILED APR. 1, 1907.
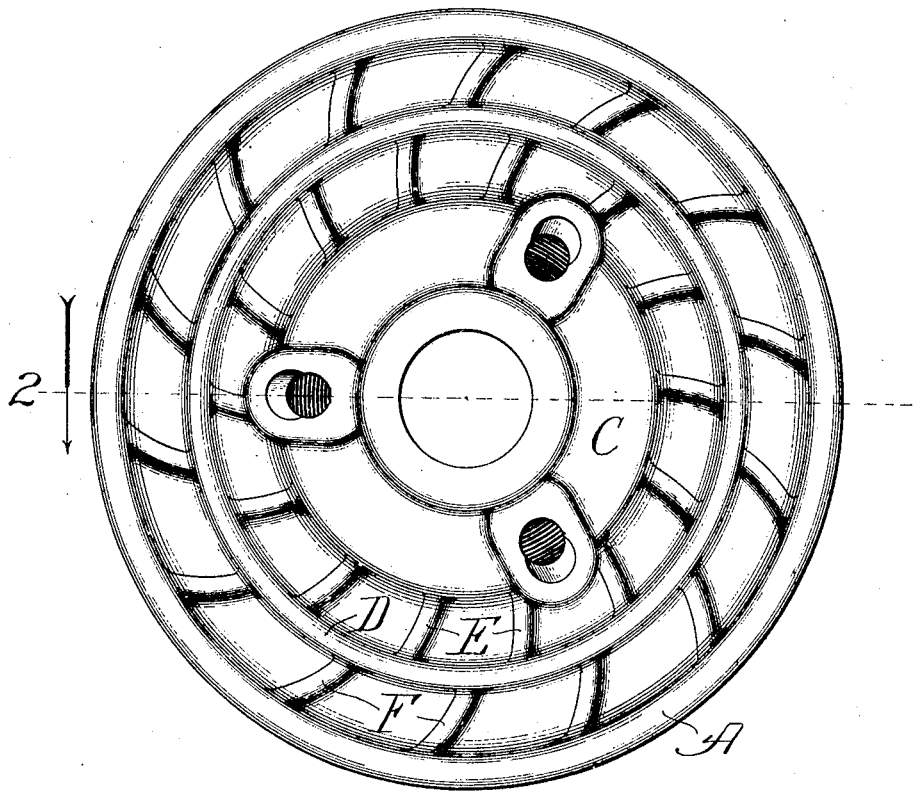
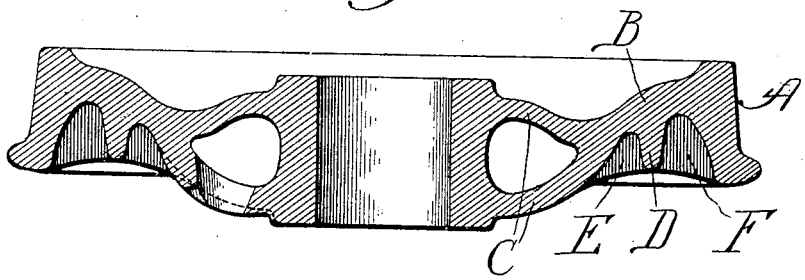
Witnesses:
Inventor:
Frederick K. Vial,
By Thomas F. Sheridan,
Atty.

UNITED STATES PATENT OFFICE.

FREDERICK K. VIAL, OF LA GRANGE, ILLINOIS, ASSIGNOR TO GRIFFIN WHEEL COMPANY, OF CHICAGO, ILLINOIS, A CORPORATION OF ILLINOIS.

CAR-WHEEL.

No. 869,671.　　　　Specification of Letters Patent.　　　　Patented Oct. 29, 1907.

Application filed April 1, 1907. Serial No. 365,853.

*To all whom it may concern:*

Be it known that I, FREDERICK K. VIAL, a citizen of the United States, residing at La Grange, in the county of Cook and State of Illinois, have invented certain new and useful Improvements in Car-Wheels, of which the following is a specification.

The object of my invention is to provide a car wheel of new and improved design for the purpose of obviating the defects inherent in such wheels as now made.

One of the features of my invention consists in the separation of the tread section of the wheel into primary and secondary parts, the primary part consisting of the ordinary flange, tread and rim, and the secondary part a ring of metal distinct from the primary part and joined thereto and to the parts of the wheel known as the single and double plates.

The precise nature of my improved wheel and the advantages inherent therein will be apparent from the following description and claims taken in connection with the drawing forming part of this specification:

In the drawings—Figure 1 is an elevation of a car wheel constructed in accordance with my invention; and Fig. 2 is a transverse section thereof.

In order to vary the strength of car wheels in accordance with the requirements met in service, it is customary to vary the thickness of the tread section in proportion to the load carried. When the tread section is thickened for the purpose of carrying heavy loads it has been found that the large body of metal of which the tread is formed renders it impossible to properly chill the metal for the reason that heat is supplied to the chilled surface from the large body of adjoining metal. This tendency is in some cases so great that the chill may be wholly or partially destroyed by reason of the fact that the combined carbon changes into graphitic-carbon. In order to obviate this objectionable action it has been necessary to use a harder mixture which will chill more easily. This expedient, however, is accompanied by the disadvantage resulting from the increased shrinkage and results in internal stresses. Instead of strengthening the wheels by thickening the tread I construct my improved wheel with an intermediate strengthening flange or annulus projecting from the single plate and connected to the tread and other parts of the wheel by brackets. By means of this expedient the thickness of the tread is maintained nearly uniform for all weights of wheels, and therefore the difficulty of properly chilling resulting from the massing of a large body of metal in the tread is avoided. A further disadvantage inherent in wheels of the M. C. B. type is the impossibility of chilling the metal at the throat to the extent possible in the flange and tread. During the operation of casting and chilling my improved wheels, the heat in the secondary strengthening rib is prevented by the intervening parts of the mold from flowing into the metal which is in contact with the chiller, thus rendering it possible to retain the maximum chill at the throat line where the greatest wear occurs.

The severe stresses due to the heating of the tread through the brake action are carried in my improved wheel from the tread section through the brackets to the annular strengthening rib, thus avoiding all danger of fracture at the point of intersection of the single and double plates.

My improved wheel comprises the usual tread portion A, single plate B and double plate C. Projecting transversely from the single plate is an annular strengthening rib D. The strengthening rib D is connected by brackets E and F to the main body of the wheel and to the tread section. The space intervening between the annular strengthening rib D and the tread of the wheel prevents such a flow of heat to the tread as to interfere with the proper chilling thereof. The strengthening of the wheel furthermore is more effectually accomplished by the annular rib D than by the ordinary expedient of thickening the tread. As explained above, the stresses set up by the brake action due to the heating of the tread section are transmitted through the brackets from the tread to the annular strengthening rib, thereby relieving the single plate from undue stresses, and avoiding the danger of fracture at the intersection of the single and double plates.

In addition to the advantages enumerated above, the dispositon of the metal in wheels constructed according to my invention facilitates the uniform cooling of the wheel and thus avoids distortion and internal stresses.

It will be apparent that my invention is not limited to a strengthening rib projecting on one side only of the wheel, as it might in some instance be desirable to dispose part of the strengthening rib on each side of the single plate, and to provide supporting brackets for each of said parts.

What I claim is:

1. A car wheel comprising a tread section, and a strengthening rib extending around the wheel inside said tread section, said strengthening rib having a free outer edge.

2. A car wheel comprising a tread section, and a strengthening rib extending around the wheel inside said tread section, said strengthening rib having a free outer edge and being connected to the tread section by a plurality of brackets.

3. A car wheel comprising a tread section, a plate section, a strengthening rib extending around the wheel inside the tread, and brackets conecting said rib to the tread and plate sections.

4. A car wheel comprising a tread section, and a circular strengthening rib extending around the wheel inside said tread section, said strengthening rib having a free outer edge.

5. A car wheel comprising a tread section, and a circular strengthening rib extending around the wheel inside said tread section, said strengthening rib having a free outer edge and being connected to the tread section by a plurality of brackets.

6. A car wheel comprising a tread section, a plate section, a circular strengthening rib extending around the wheel inside the tread, and brackets connecting said rib to the tread and plate sections.

7. A car wheel comprising a hub, a double plate section surrounding said hub, a single plate section outside of said double plate section, a tread, a strengthening rib extending around the wheel and projecting from said single plate section, and brackets connecting said rib to the tread and to the single and double plate sections.

FREDERICK K. VIAL.

Witnesses:
NORMAN A. STREET,
WALTER A. SCOTT.